United States Patent [19]
Adlon et al.

[11] Patent Number: 4,522,097
[45] Date of Patent: Jun. 11, 1985

[54] RIBBON CABLE SPLITTER

[75] Inventors: Daniel T. Adlon, Swatara; Edward A. Bianchi, Hummelstown, both of Pa.

[73] Assignee: AMP Incorporated, Harrisburg, Pa.

[21] Appl. No.: 526,302

[22] Filed: Aug. 25, 1983

[51] Int. Cl.³ .............................................. B26D 1/18
[52] U.S. Cl. ................................. 83/464; 83/487; 83/555; 83/925 R; 83/926 B; 83/471.2
[58] Field of Search .......... 83/487, 488, 345, 500–503, 83/925 R, 861, 471.2, 461, 464, 452–454, 926 B, 83/555

[56] References Cited

U.S. PATENT DOCUMENTS

| | | | |
|---|---|---|---|
| 1,139,355 | 5/1915 | Feeley | 83/664 |
| 3,575,329 | 4/1971 | Hannuberry | 83/500 |
| 3,771,398 | 11/1973 | Schaefer | 83/500 |
| 4,267,757 | 5/1981 | Frantz | 83/471.2 |
| 4,275,630 | 6/1981 | Goldsmith | 83/500 |
| 4,434,695 | 3/1984 | Wingon | 83/503 |

FOREIGN PATENT DOCUMENTS

| | | | |
|---|---|---|---|
| 575262 | 8/1958 | Italy | 83/503 |

*Primary Examiner*—James M. Meister
*Assistant Examiner*—John L. Knoble
*Attorney, Agent, or Firm*—F. Brice Faller

[57] ABSTRACT

Apparatus for separating individual conductors of a ribbon cable comprises a pair of rollers having annular teeth which intermesh to split the cable as the rollers are moved together. The cable is clamped in a stationary frame and the rollers are mounted for rotation in a carriage which moves linearly in the frame to separate the conductors along a length of the cable.

10 Claims, 7 Drawing Figures

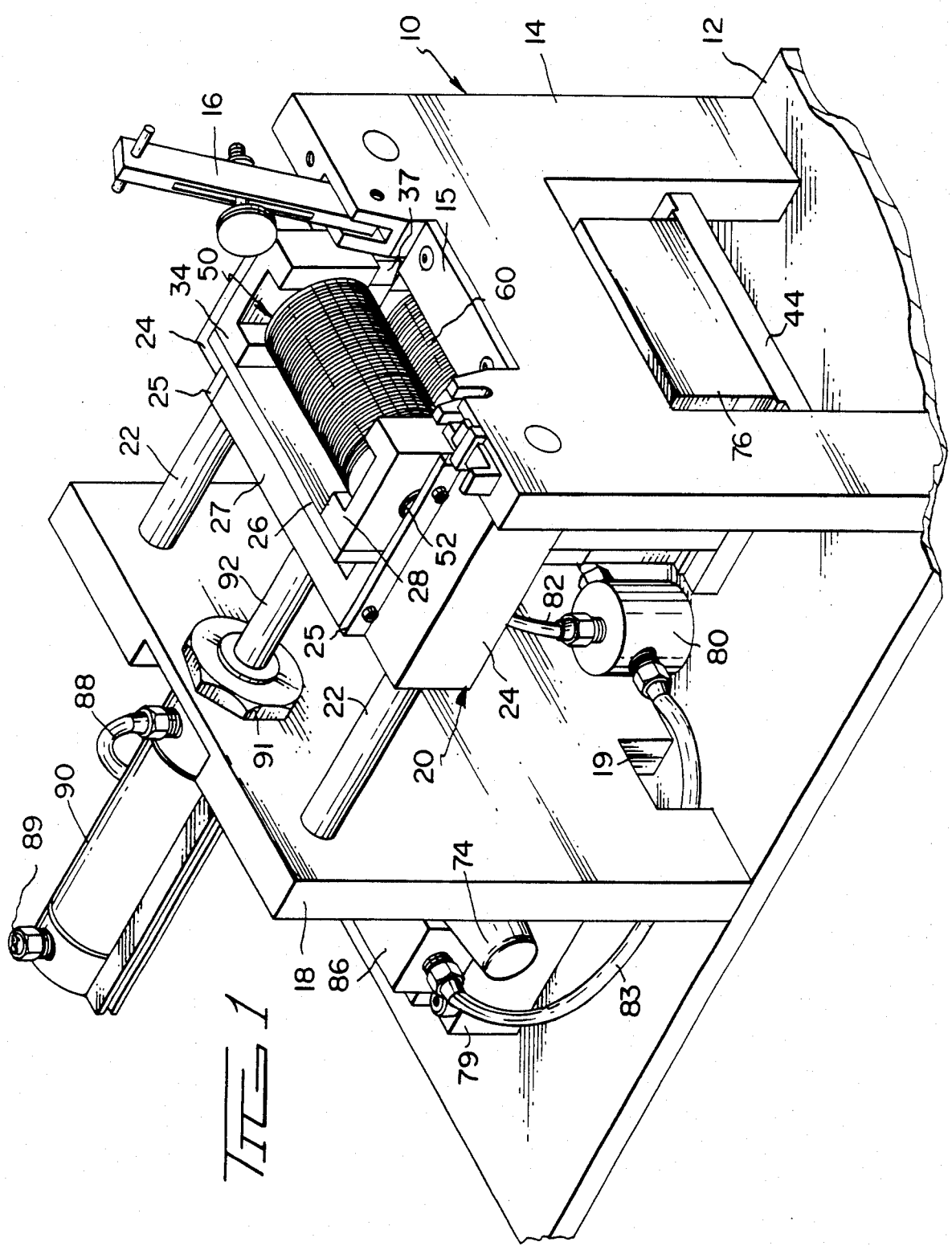

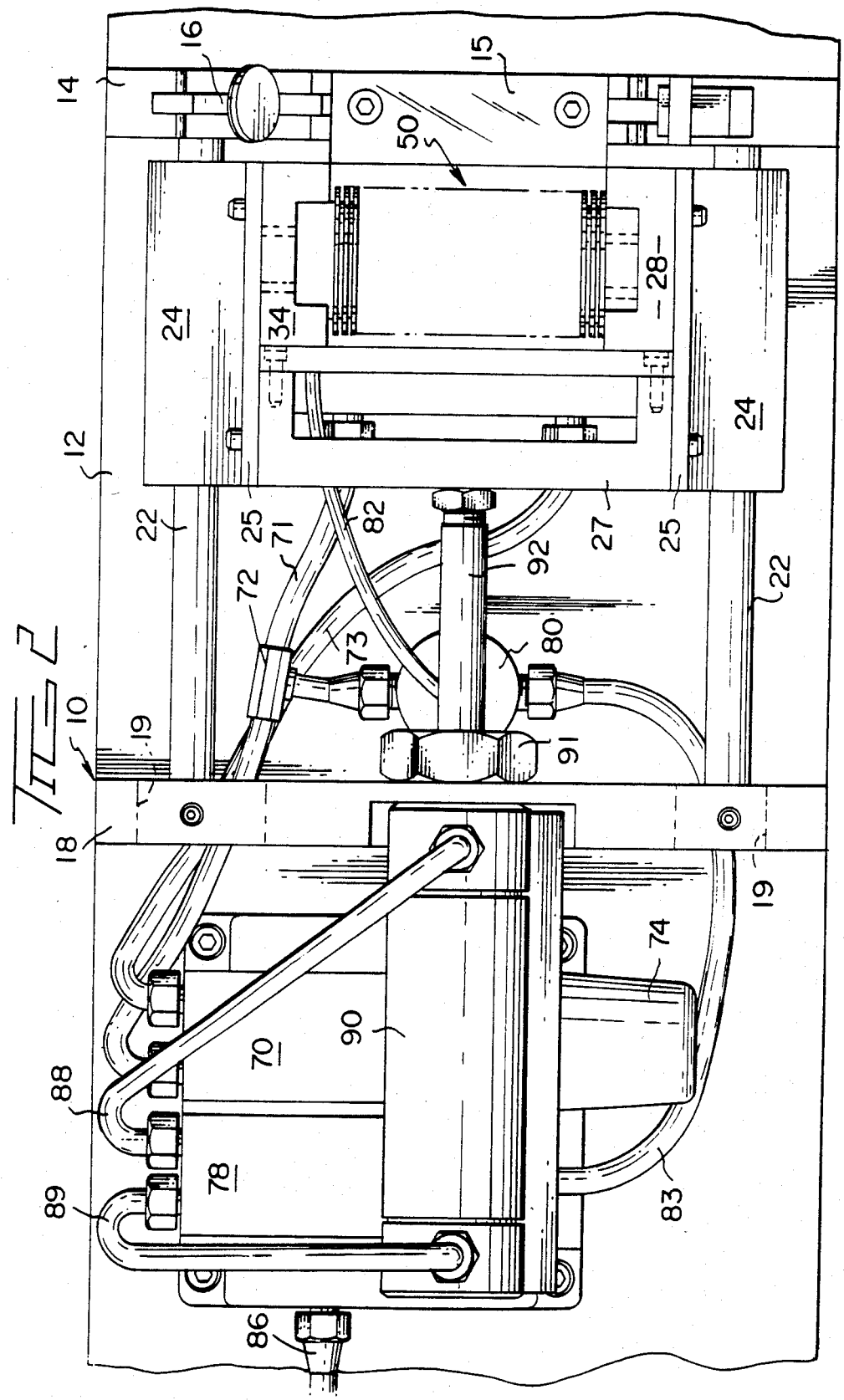

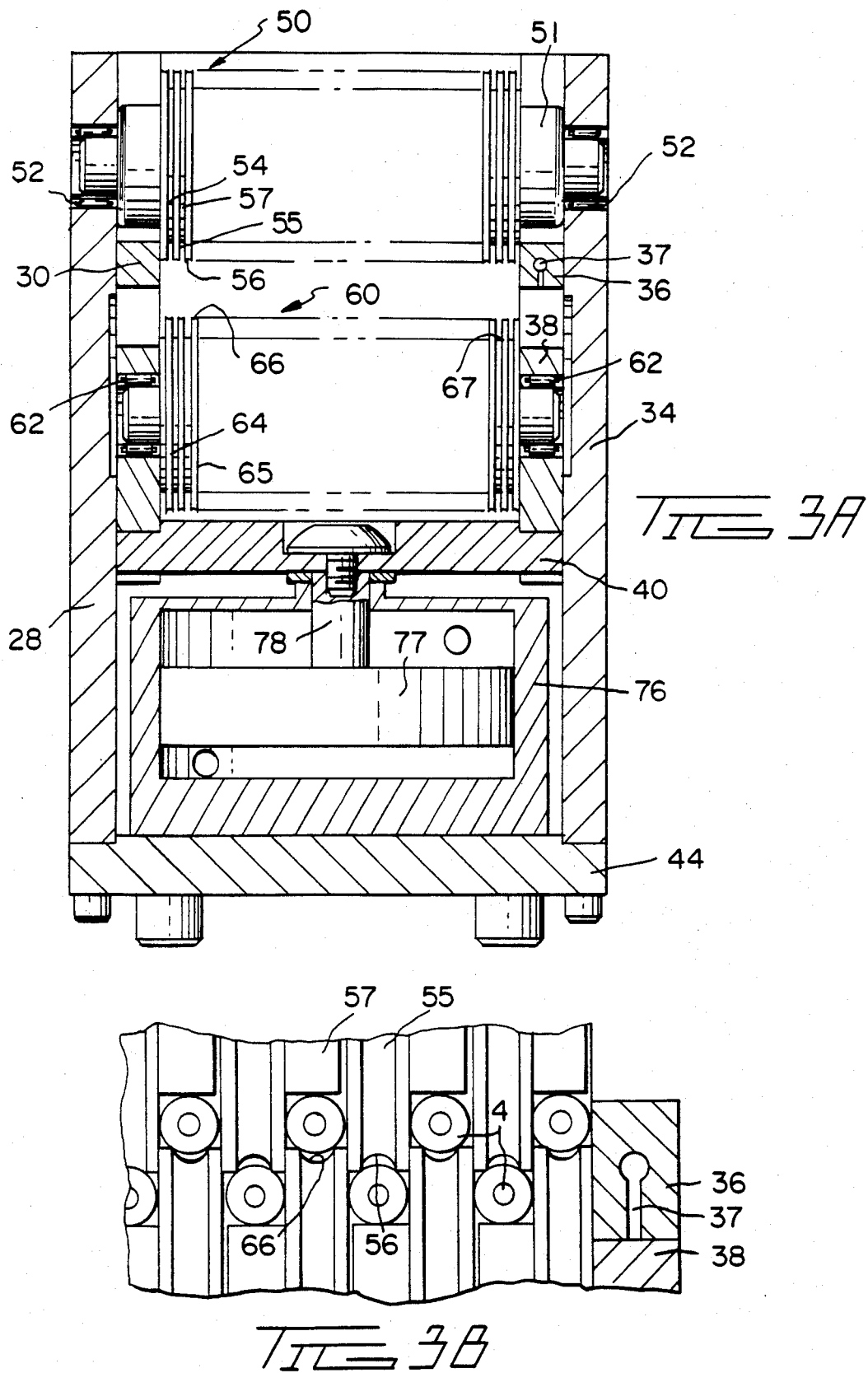

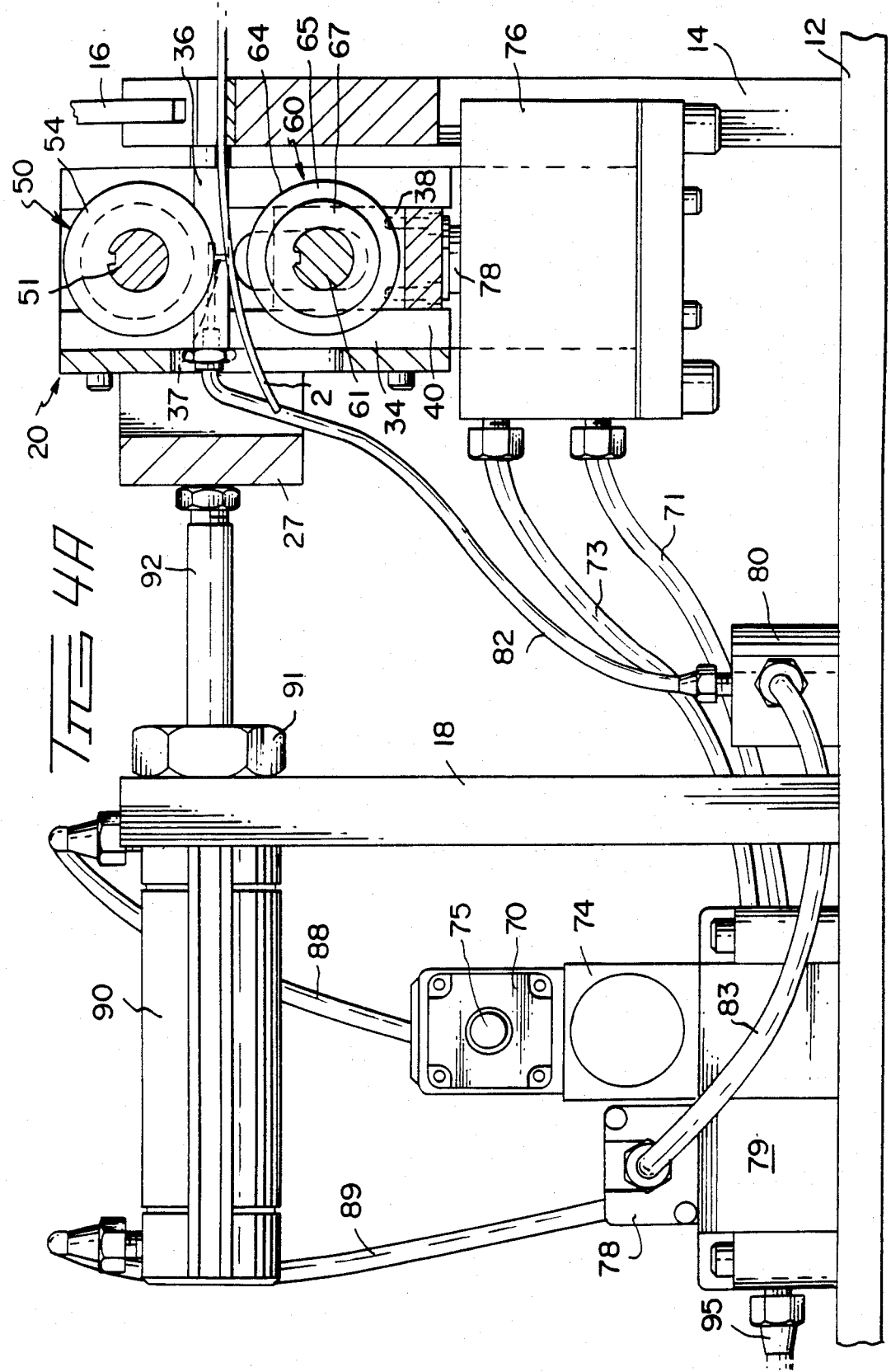

4,522,097

RIBBON CABLE SPLITTER

BACKGROUND OF THE INVENTION

The present invention relates to a splitter for separating the individual conductors of a ribbon cable.

Ribbon cable provides an economical and easy to handle means for carrying groups of conductors. Individual conductors are typically mass terminated to connectors having rows of contacts. Many of these connectors have contact spacing which requires splitting the cable so that the conductors may be terminated individually.

U.S. Pat. No. 3,575,329 discloses a ribbon cable splitter of the type comprising first and second rollers having parallel axes, each roller having a plurality of parallel radially extending annular teeth, the centerline spacing of adjacent teeth being twice the centerline spacing of adjacent conductors of the ribbon cable, the teeth on each roller being aligned with the spaces on the other roller. The apparatus further comprises means for moving the rollers relatively together to engage the cable and to urge adjacent conductors in opposite directions to separate them, alternate conductors being urged in the same direction.

The above-described apparatus utilizes a cam mechanism to bring the rollers together and a hand crank to feed the cable out of the rollers and separate the conductors. The cam mechanism does not readily lend itself to sensing alignment of the cable as it is engaged by the rollers, and the rollers require rotary drive means. Separated conductors tend to curl with the adjacent teeth of each roller.

SUMMARY OF THE INVENTION

The present invention is characterized in that it comprises a clamp for clamping the cable and a carriage for moving the rollers relative to the clamp. The rollers rotate freely in response to movement of the carriage, when the cable is clamped by the clamp and engaged by the rollers, whereby the conductors are separated along a length of the cable.

In the preferred embodiment, the clamp is mounted on a stationary frame and the rollers are mounted on a carriage which slides reciprocably in the frame, the carriage being driven by a double-acting air cylinder fixed to the frame. The second or lower roller is driven upward to engage the cable by an air cylinder mounted on the carriage. Air pressure is adjustable for various cable widths to ensure that the annular teeth do not penetrate the cable unless it is properly aligned. Sensing means is also provided to ensure that the cable is fully engaged by the rollers before the carriage is moved.

The invention thus achieves cable splitting without rotary drive means for the rollers, in an apparatus which lends itself readily to automation. All drive and sensing means may readily be provided by simple devices such as air cylinders and solenoid valves.

BRIEF DESCRIPTION OF THE DRAWINGS

FIG. 1 is a perspective of the cable splitting apparatus.

FIG. 2 is a top plan view.

FIG. 3A is a section view taken along line 3—3 of FIG. 2 showing the rollers open.

FIG. 3B is a fragmentary section view showing the rollers engaging the cable.

FIG. 4A is a side view of the apparatus before cable engagement.

DETAILED DESCRIPTION OF THE INVENTION

Figure 4B:
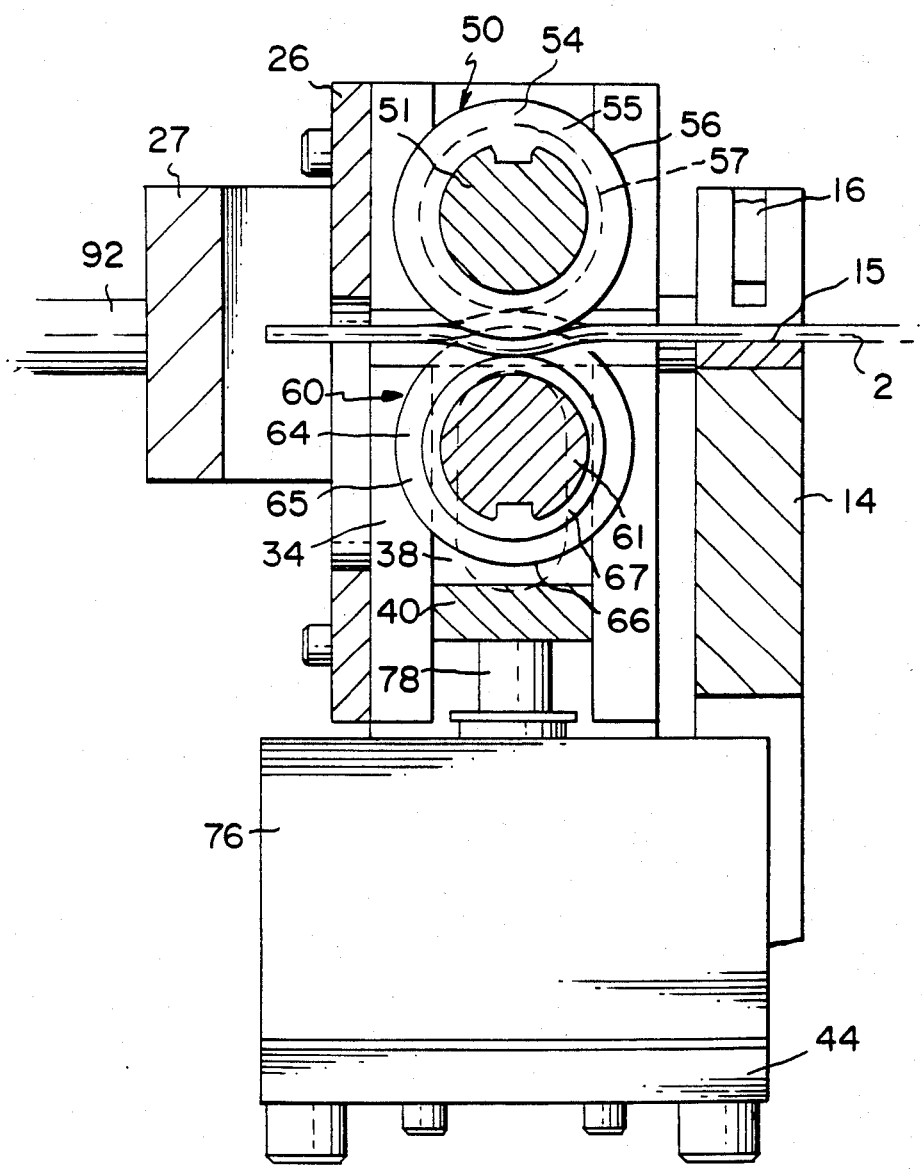
FIG. 4B is a fragmentary side view after cable engagement.

FIG. 1 is a perspective of the cable splitting apparatus which is used for splitting ribbon cable of the type having a parallel planar array of insulated conductors encased in an insulative medium such as PVC. The apparatus comprises a frame 10 fixed to a base 12 and includes a front wall 14 and a rear wall 18. The front wall 14 has a clamping surface 15 thereon and a hinged clamp 16 for clamping the cable against surface 15. The clamp may have any of a variety of configurations which are well known. A carriage 20 slides on a pair of shafts 22 which are fixed between walls 14, 18. The carriage 20 includes a pair of bearing blocks 24 which are journaled on shafts 22 for linear movement, the blocks 24 having flanges 25 which are bolted to left and right outer carrier plates 28, 34 respectively and driven plate 27 which extends between the blocks 24. Upper roller 50 is journaled in plates 28, 34 by needle bearings 52; the axis of roller 50 is stationary relative to carriage 20. Lower roller 60 is arranged for vertical movement in the carriage 20, which movement is effected by air cylinder 76 mounted on plate 44 which is part of the carriage 20.

The carriage 20 reciprocates on shafts 22 in response to changing pressure in double-acting air cylinder 90, which is mounted to rear wall 18 by nut 91. Air pressure in line 88 draws rod 92 into the cylinder so that carriage 20 approaches rear wall 18 to split a cable, while air pressure in line 89 effects return of the carriage 20. Other salient features are electric solenoid valve 70 which controls air pressure to cylinder 76, and sensing valve 80 which detects the vertical position of roller 60 through sensing line 82 and admits air pressure to pilot-operated valve 78 through pilot line 83.

FIG. 2 is a top plan view of the apparatus, which further details the controls. After a ribbon cable is clamped against surface 15, an electric solenoid valve 70 initiates a cycle by admitting air to cylinder 76 through line 71. A tee 72 connects line 71 to sensing valve 80 which remains closed until back-pressure in sensing line 82 signals full engagement of a cable as will be described. Engagement, as the term is used herein, means penetrating of the cable by opposed wheels 50, 60 to force the adjacent conductors in opposite directions (FIG. 3B). The pressure required to engage cables of different widths varies, and is controlled by pressure regulator 74. Pressure may thus be adjusted to assure the cable is not engaged unless it is properly aligned, as will be shown in FIGS. 3A and 3B. Back-pressure in line 82 causes valve 80 to open and the resultant pressure in pilot line 83 causes pilot-operated valve 78 to trigger rearward motion of carriage 20 as previously described. The removal of electrical power to solenoid 70 pressurizes line 73 and depressurizes line 71, causing the rollers 50, 60 to open and the carriage 20 to return. Note that lines 71, 73 are flexible tubing arranged to permit reciprocation of the carriage 20. Lines 71, 73 and 83 pass through apertures 19 in the bottom of rear wall 18.

FIG. 3A is an elevation of the carriage 20 showing rollers 50, 60 before engaging ribbon cable 2. Upper roller 50 comprises a series of discs 54 mounted on shaft 51, which is journaled in needle bearings 52 in left side outer carrier plate 28 and right side outer carrier plate 34. Each disc 54 has a radially extending annular tooth 55 and an adjacent spacer 57 of smaller diameter. Lower roller 60 comprises the like discs 64 mounted on shaft 61 which is journaled in needle bearings 62 in left side inner carrier plate 32 and right side inner carrier plate 38. Inner carrier plates 32, 38 are arranged to slide vertically in outer carrier plates 28, 34 respectively; the inner plates 32, 38 are both fixed to drive plate 40 which is driven vertically by double-acting cylinder 76 having a three-inch piston 77 therein connected to plate 40 by rod 78. Piston 77 is sized to permit engagement of cable 2 directly, while requiring only air pressures normally used in manufacturing areas. The annular teeth 55 of discs 54 are positioned opposite spacers 67 of discs 64, and likewise the annular teeth 65 are positioned opposite spacers 57. The centerline spacing of adjacent teeth on each roller 50, 60 is twice the centerline spacing of adjacent conductors 4 in cable 2. Left and right stop bars 30, 36, mounted on outer plates 28, 34 respectively, limit the upward travel of inner carrier plates 32, 38 respectively. The right stop bar 36 has an orifice 37 therein which passes air from sensing line 82; when the cable 2 is fully engaged, the inner carrier plate 38 blocks the orifice and causes the back-pressure which opens sensing valve 80 to effect rearward movement of carriage 20 to longitudinally split apart the individual conductors.

FIG. 3B is an enlarged view of the rollers 50, 60 engaging a cable. Note that adjacent conductors 4 are deflected in opposite directions, while alternate conductors 4 are deflected in the same direction. Each annular tooth 55, 65 has a concave peripheral surface 56, 66, which surfaces cradle the individual conductors to help assure alignment while the cable is being sheared longitudinally while the teeth 55 are between teeth 65. Note, however, that initial alignment is determined by cable placement prior to clamping. Air pressure controlling upward movement of roller 60 should be set so that the teeth 55, 65 will not penetrate the cable unless the edges of the teeth 55, 65 are adjacent the grooves between conductors, which is the shear point of least resistance.

Figure 4C:
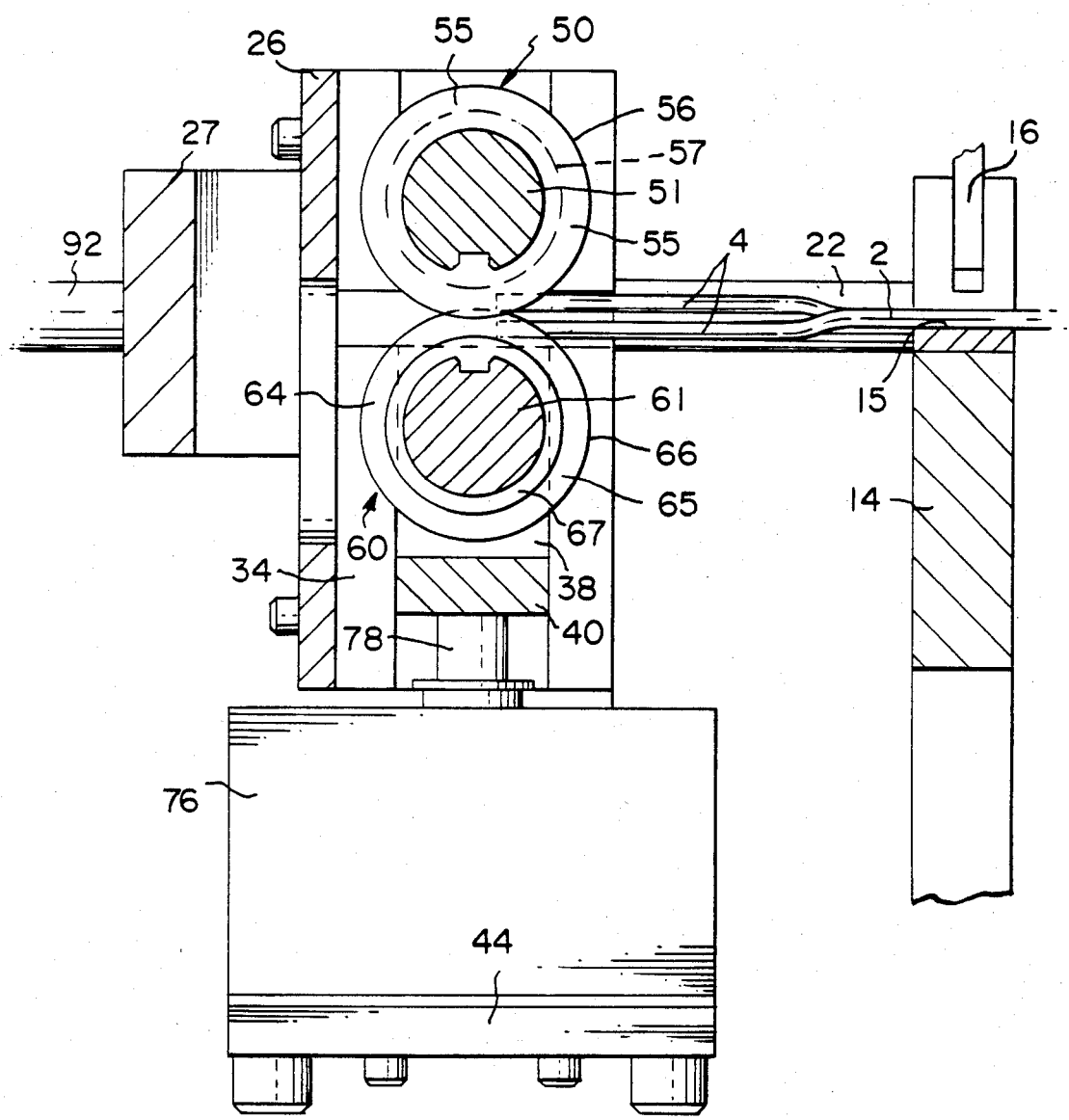
FIG. 4C is a fragmentary side view after cable splitting.

FIGS. 4A, 4B and 4C are side views of the apparatus showing the sequence of cable splitting. FIG. 4A is a full side view with a section through the carriage 20 taken along line 4—4 of FIG. 2. The ribbon cable 2 is clamped in front wall 14 by clamp 16 and extends between rollers 50, 60. The rollers are sectioned between discs 54 on roller 50 against an annular tooth 55 and in a common plane between discs 64 on roller 60 against a spacer 67. Note that the discs 54, 64 are keyed on shafts 51, 61 respectively. This feature reduces thelikelihood of twisting the cable during splitting due to variation in loads across its width. Inner plate 38 is arranged to slide vertically in outer plate 34 in response to pressure in line 71. Both lines 71, 72 are attached to ports in manifold 79, which ports are valved through electric solenoid valve 70, which can also be operated manually at switch 75. Lines 88, 89, which provide air for reciprocating motion of carriage 20, are also attached to ports in manifold 79, and are valved through pilot-operated valve 78. Plant air is provided to manifold 79 through line 95 at constant pressure.

FIG. 4B is a fragmentary side sectional view showing carriage 20 after rollers 50, 60 have engaged the cable 2. Annular teeth 54 have cooperated with annular teeth 64 to shear through insulation between individual insulated conductors 4, alternate conductors being urged toward spacers 67. Teeth 64 likewise urge the remaining alternate conductors 4 toward spacers 57. As previously discussed, closure of rollers 50, 60 to engage cable 2 causes back-pressure in sensing line 82, which in turn triggers pressure in line 88 to move the carriage 20 toward rear plate 18. The rollers 50, 60 rotate freely in response to translation of the carriage until the individual conductors are split apart to the end of the cable as shown in FIG. 4C. The free rotation, as compared to driving the rollers to feed the cable therethrough as in the prior art, yields two arrays of conductors which do not curl away from each other but are still suitably spaced for termination to a two-sided connector. This is because the rollers provide tension on the conductors during splitting to keep them straight. Note that the operative mechanisms described herein and depicted in the accompanying drawings are suitable for splitting conductors apart anywhere along the length of a ribbon cable so that the apparatus may be used for preparing cable for "daisy chain" connector application.

The above description is exemplary and not intended to limit the scope of the claims which follow:

We claim:

1. An apparatus for separating the individual conductors of a ribbon cable, the apparatus being of the type comprising first and second rollers having parallel axes, each roller comprising a plurality of parallel radially extending annular teeth having spaces therebetween, the centerline spacing of adjacent teeth of each roller being twice the centerline spacing of adjacent conductors of the ribbon cable, the teeth on each roller being aligned with the spaces on the other roller, the circumferential surface of each annular tooth being generally concave, the apparatus further comprising means for moving the rollers relatively together to engage said cable and to urge adjacent conductors in opposite directions to separate them, alternate conductors being urged in the same direction, characterized in that said apparatus further comprises clamping means for clamping said cable and carriage means for moving said rollers relative to said clamping means, said teeth rotating freely in response to movement of said carriage means when said cable is clamped by said clamping means and engaged by said rollers, whereby said conductors are separated along a length of the cable.

2. The apparatus of claim 1 characterized in that said clamping means is mounted on a stationary frame, said rollers being mounted on a carriage which moves relative to said frame.

3. The apparatus of claim 2 characterized in that the axis of said first roller is stationary and the axis of said second roller is movable relative to the axis of said first roller.

4. The apparatus of claim 3 characterized in that the second roller is moved toward said first roller pneumatically, whereby pressure with which a cable is engaged may be controlled by varying the air pressure which moves the rollers together.

5. The apparatus of claim 4 wherein the air supply to move said second roller toward said first roller passes through a flexible tube to a cylinder on said carriage.

6. The apparatus of claim 5 wherein said flexible tube has a tee where air is supplied to a sensing valve, said sensing valve passing air through a flexible line to an orifice on said carriage adjacent said first roller, said orifice being arranged to be blocked by said second roller when said cable is engaged, said sensing line having a back-pressure sensing valve thereon, said sensing valve directing air through a pilot line to a pilot valve when back-pressure is sensed, said pilot valve in turn actuating movement of said carriage means.

7. The apparatus of claim 2 characterized in that the carriage means is moved pneumatically.

8. An apparatus as in claim 1 wherein said rollers each further comprise a shaft on which said teeth are fixed against rotation relative to said shaft, said shafts being journaled for rotation in said carriage means.

9. The apparatus of claim 4 wherein sensing means is provided for sensing when the first and second rollers have fully engaged the cable, said second means triggering movement of said carriage only when the rollers are fully engaged.

10. The apparatus of claim 9 wherein the air supply to move said second roller toward said first roller passes through a flexible tube to a cylinder on said carriage, said flexible tube having a tee where air is supplied to said sensing means, said sensing means comprising a sensing valve which passes air through a flexible line to an orifice on said carriage adjacent said first roller, said orifice being arranged to be blocked by said second roller when said cable is engaged, said sensing line having a back-pressure sensing valve thereon, said sensing valve directing air through a pilot line to a pilot valve when back-pressure is sensed, said pilot valve in turn actuating movement of said carriage means.

* * * * *

UNITED STATES PATENT OFFICE
CERTIFICATE OF CORRECTION

Patent No. 4,522,097  Dated June 11, 1985

Inventor(s) Daniel T. Adlon and Edward A. Bianchi

It is certified that error appears in the above-identified patent and that said Letters Patent are hereby corrected as shown below:

Column 5, Line 17, change the word "second" to the word --sensing--.

Signed and Sealed this

Twenty-sixth Day of November 1985

[SEAL]

Attest:

DONALD J. QUIGG

Attesting Officer  Commissioner of Patents and Trademarks